US006098971A

United States Patent [19]

Stege et al.

[11] Patent Number: 6,098,971

[45] Date of Patent: Aug. 8, 2000

[54] PEDAL MODULE WITH VARIABLE HYSTERESIS

[75] Inventors: Jeffrey Jean Stege, Linden; Steven Alan Kornburger, Waterford, both of Mich.

[73] Assignee: General Motor Corporation, Detroit, Mich.

[21] Appl. No.: 09/081,624

[22] Filed: May 19, 1998

[51] Int. Cl.[7] .................... B60G 11/14

[52] U.S. Cl. .................... 267/251; 267/216; 74/567; 74/569

[58] Field of Search .................... 267/201, 216, 267/251, 253, 174, 179, 248; 74/55, 513, 567, 569

[56] References Cited

U.S. PATENT DOCUMENTS

| | | | |
|---|---|---|---|
| 212,021 | 2/1879 | Lowe | 267/251 |
| 1,818,414 | 8/1931 | Marsey | 267/251 |
| 4,944,269 | 7/1990 | Imoehl | 74/513 |
| 4,958,607 | 9/1990 | Lundberg | 74/513 |
| 5,239,891 | 8/1993 | Stocker | 74/569 |
| 5,241,936 | 9/1993 | Byler et al. | 74/513 |

*Primary Examiner*—Robert J. Oberleitner
*Assistant Examiner*—Mariano Sy
*Attorney, Agent, or Firm*—Vincent A. Cichosz

[57] ABSTRACT

A variable hysteresis module for use with an accelerator pedal with an electronic throttle control system for vehicles and the like includes a follower moveable along a back plate and urged by return springs against a cam actuator. The actuator acts against an angled side of the follower that resolves the pedal force on the actuator into a parallel component opposing the spring force and a normal component urging the follower against the back plate to develop friction that produces hysteresis. The hysteresis varies with the force of the return springs and so generally increases as the engine throttle is opened and decreases as the engine throttle is returned closed. If the spring force is reduced, the friction force is proportionally reduced. Other variations are also disclosed.

10 Claims, 2 Drawing Sheets

16
28
13
12
32
40
24
30
26
14
22
18
10
38
34
36

38
14
20
2

PEDAL MODULE WITH VARIABLE HYSTERESIS

TECHNICAL FIELD

This invention relates to accelerator pedal modules for vehicle engines with electronic throttle control systems and particularly to modules providing variable hysteresis.

BACKGROUND OF THE INVENTION

In an electronic throttle control system, a potentiometer replaces the cable that normally runs to the throttle body of a vehicle engine. Wires send a pedal position signal from the potentiometer to a microprocessor which determines how much throttle opening to provide. An inherent problem of such a system is that the pedal must now have its own return springs. The "feel" of an electronic pedal can be very different from that of a cable system since cables have hysteresis whereas a simple return spring on a pedal module has little or no hysteresis. Accordingly, pedal modules for electronic throttle control systems have in the past included mechanisms for providing hysteresis. However, these have usually consisted of friction plates or means that create forces independent of the return spring forces. If the hysteresis friction is too high, optimal pedal operation may not be achieved. To avoid this, the hysteresis friction must be limited to an extent where it may not provide the desired pedal "feel".

SUMMARY OF THE INVENTION

The present invention provides a pedal module for use with electronic throttle control systems and the like. The module includes return springs as part of a variable hysteresis mechanism in which hysteresis is greater at the wide open throttle end of the pedal travel than it is at the beginning of its travel. In addition, the invention provides hysteresis forces that are dependent upon the return spring forces. If the return spring force is reduced, the hysteresis force is reduced proportionally. This eliminates the possibility of excessive hysteresis interfering with optimal pedal operation.

These and other features and advantages of the invention will be more fully understood from the following description of certain specific embodiments of the invention taken together with the accompanying drawings.

DESCRIPTION OF THE PREFERRED EMBODIMENT

Figures 1, 2:
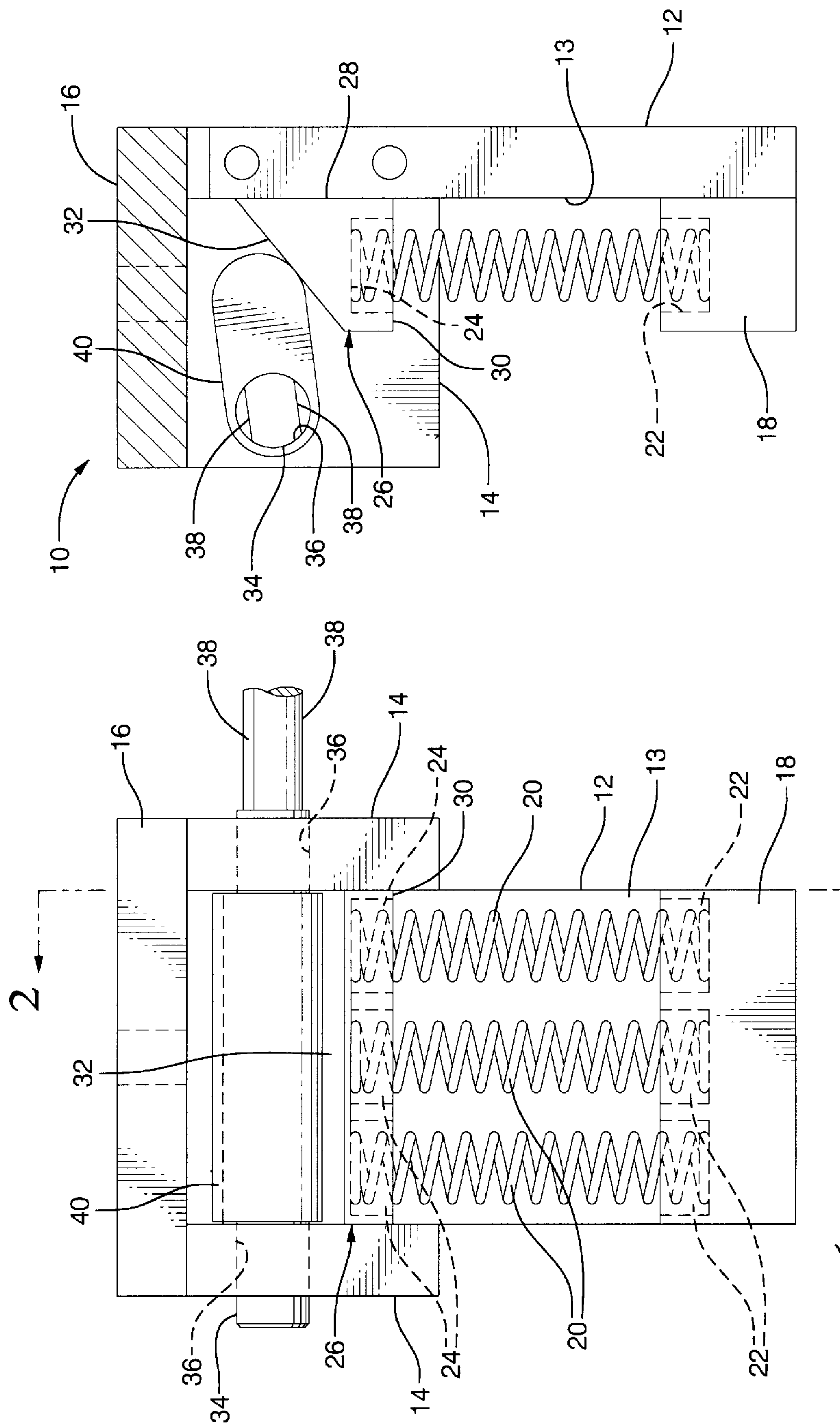
FIG. 1 is a face view of an exemplary embodiment of pedal module including a variable hysteresis mechanism in accordance with the invention.
FIG. 2 is a cross-sectional view from the line 2—2 of FIG. 1.

Referring now to the drawings in detail, numeral 10 generally indicates a pedal module for use with a vehicle engine electronic throttle control system. Module 10 includes a back plate 12 having a sliding surface 13 shown in a vertical position in the figures, although the module may be oriented otherwise in use. A pair of side plates 14 are attached to opposite edges of the upper portion of the back plate and extend forward therefrom. A top plate 16 is fixed to the upper edges of the back plate and the side plates and covers the open area between the side plates. The plates 12, 14, 16 may be made of aluminum or plastic.

A spring retainer 18 is mounted across the front of the lower edge of the back plate 12 and receives three laterally spaced vertically extending compression return springs 20 seated in pockets 22 in the spring retainer. The springs 20 extend upward into corresponding pockets 24 in a follower 26 made from a block of plastic bearing material, such as Teflon. Follower 26 has a first side 28 which engages and slides against the sliding surface 13 of the back plate 12. Pockets 24 are formed within a second lower side 30 of the follower. A third angled side 32 of the follower extends forward and downward at an angle from the first side 28 toward the lower side 30, forming an angle $\alpha$ with a line parallel with the lower side and normal to the first side 28.

Spaced forward of the follower 26, a shaft 34 is rotatably received in bearing openings 36 in the side plates 14 and extends between the side plates 14 parallel with the sliding surface 13 of the back plate, and out through openings 36. At one end, the shaft 34 includes flats 38 for mounting of an accelerator pedal thereon or for connection to an accelerator pedal, not shown. An oblong stainless steel member, called a cam 40, is mounted on the shaft 34 and extends approximately the width of the space between the side plates 14. Cam 40 has parallel top and bottom sides with semicircular front and rear ends. Shaft 34 extends through the front end and is fixed to the cam for pivotal motion therewith. The semicircular rear end of the cam is positioned to engage the angled side 32 of the follower when the cam is positioned as shown in FIG. 2 with the rear end raised slightly above a horizontal plane.

Figure 3:
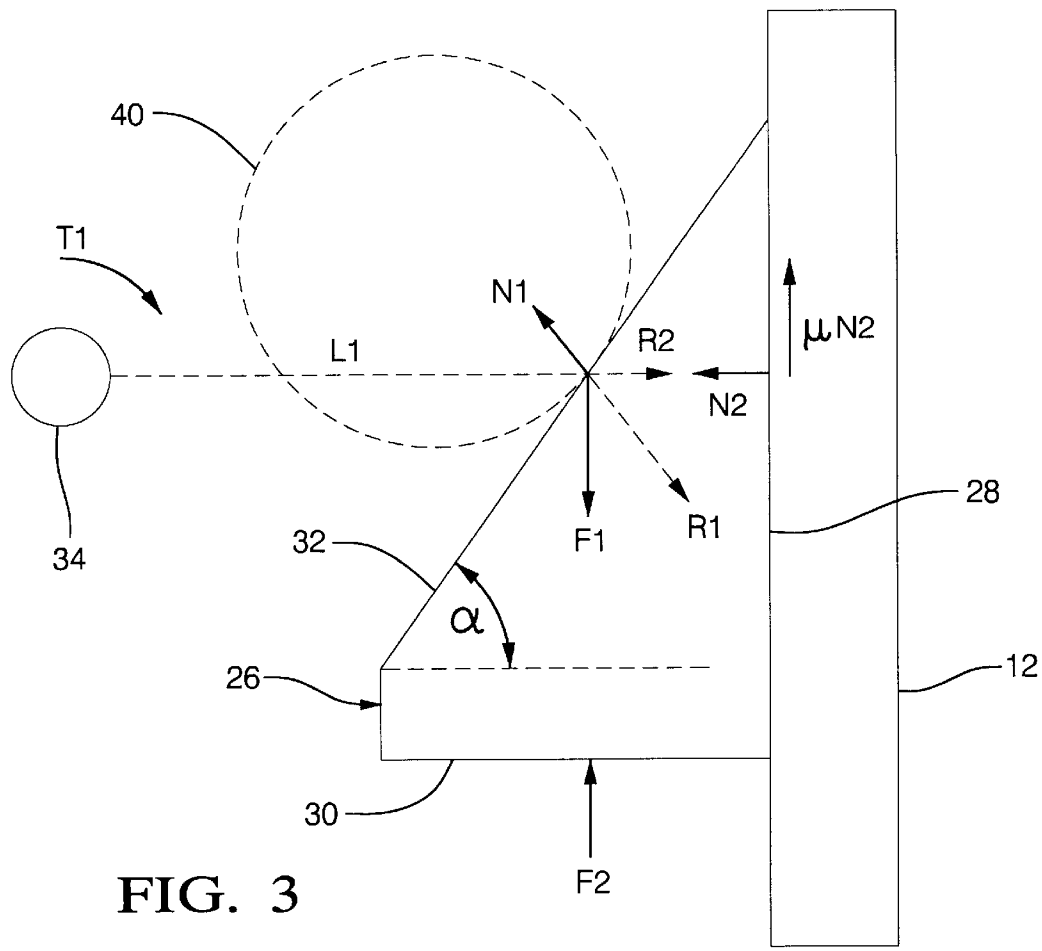
FIG. 3 is a free body diagram illustrating forces acting on the hysteresis mechanism.

In operation of the pedal module as used in a vehicle, the return springs 20 are loaded in compression so as to urge the follower 26 against the cam 40 under all operating conditions. As shown in FIG. 3, engagement of the cam 40 by the angled side 32 of the follower 26 creates a lateral side force R2 on the follower which urges the first side 28 against sliding surface 13 of the back plate 12 with a force R2 proportional to the force of the springs 20. This side force develops friction between the follower 26 and the back plate 12 which opposes movement of the follower in either direction and thus provides hysteresis in the module. The result is that greater force is required to move the accelerator pedal connected with shaft 34 in a throttle opening direction, which moves the follower downward, than is required to return the accelerator pedal to the idle position, which moves the follower upward.

Figure 4:
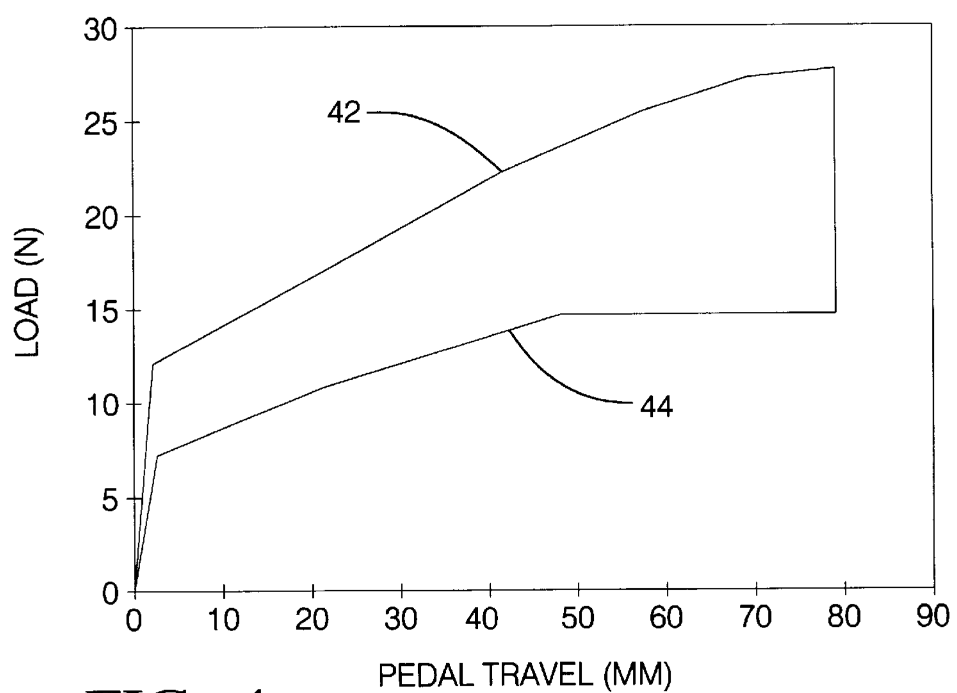
FIG. 4 is a graph of load in newtons versus pedal travel in millimeters illustrating the variable hysteresis of the mechanism.

FIG. 4 graphically illustrates the resulting loads, an upper line 42 illustrating the force required for moving the pedal in a throttle opening direction and a lower line 44 showing the force required for returning the pedal to and idle position. The relatively vertical lines at the ends of lines 42 and 44 generally indicate the hysteresis change between the throttle opening and throttle closing directions of motion. The variable slope of the lines 42 and 44 is a result of the varying forces developed by the return springs 20 as they are compressed and expanded by the downward and upward motion of the follower. These changes vary the friction force proportionally and thus cause an increase in hysteresis as the pedal is moved toward the throttle opening direction.

Referring now to FIG. 3, a free body diagram is illustrated indicating the resolution of forces on the follower of the variable hysteresis mechanism. The pedal module consists of the input shaft 34, cam 40, angled cam follower 26 and three return springs 20 (see FIG. 1). Looking at the free body diagram in FIG. 3, we see the following relationships:

$F1=T1/L1$ This is the force from a given torque (T1) over length (L1).

and $F1=F2+\mu N2$ $\mu N2$ is the frictional force that produces hysteresis. F2 is the opposing force of the three return springs.

This shows that the force F1 (and therefore the torque T1) result from the combination of two forces; F2 (the opposing force of the return springs) and $\mu N2$ (the frictional force that produces hysteresis). The ratio of F2 to $\mu N2$ can also be changed by changing the angle $\alpha$. It can be seen that as $\alpha$ gets smaller, $\mu N2$ will also get smaller producing less hysteresis. As $\alpha$ gets larger, $\mu N2$ gets larger providing more hysteresis. This can be very useful in fine tuning a pedal module to give it the correct "feel".

It can also be shown that as F2 decreases, $\mu N2$ also decreases proportionally. Assuming that, by original design, F2 is greater than $\mu N2$, $\mu N2$ cannot become larger than F2. If, for instance, spring force F2 is reduced, $\mu N2$ will also decrease proportionally.

$$F2=F1-\mu N2$$

$$R2=F1(\tan\alpha)$$

and $$N2=R2$$

so:

$$N2=F1(\tan\alpha) \text{ and } F1=N2/\tan\alpha$$

substituting in the first equation:

$$F2=N2/(\tan\alpha)-\mu N2$$

rearranging gives:

$$F2=N2[(1/\tan\alpha)-\mu]$$

Since $\mu$ and $\alpha$ are both constants, then:

$$F2=N2(k)$$

So, as F2 decreases, N2 must decrease. The converse is also true. As F2 increases, N2 must increase. This relationship prevents the hysteresis force from ever becoming greater than the return force.

The angled cam follower of the illustrated embodiment gives the pedal module it's hysteresis or pedal "feel". The angled follower gives the design a measure of adjustability since the hysteresis or "feel" can be changed by changing the angle $\alpha$ or the cam profile. Alternatively the coefficient of friction $\mu$ can be changed by changing the materials in the cam follower or back plate. This will also change the hysteresis.

There are other possible modifications to the variable hysteresis pedal module also. The shaft and cam could be replaced by a simple plunger that would act on the angled cam follower in the same way as the pivotable cam actuator, but the motion would be linear rather than rotational.

Another variation would be to apply the return spring force at an angle to the back plate, thus creating or varying the friction causing hysteresis.

These variations still have the unique feature of variable hysteresis which is dependent on the return spring forces.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A variable hysteresis module for use with an accelerator pedal for an electronic throttle control system, said module including:

a back plate having a sliding surface;

a follower having a first side engaging and slidable along said sliding surface;

an actuator movable with a force against said follower for sliding the follower in a first direction along said sliding surface, the actuator engaging the follower along an angular interface that directs a portion of the actuator force laterally against the sliding surface; and resilient means continuously urging the follower toward said actuator with a return force of determinable value acting parallel to said sliding surface;

said actuator and said resilient means combining to continuously urge said follower against said sliding surface to create a friction force that opposes sliding motion of said follower, said friction force being less than and varying with said return force in a predetermined ratio so that, upon release of the actuator, the resilient means can always return the module to an initial position even though the return force may be reduced.

2. A variable hysteresis module for use with an accelerator pedal for an electronic throttle control system for vehicles, said module including;

a back plate having a sliding surface;

a follower having a first side engaging and slidable along said sliding surface;

an actuator movable with a force against said follower for sliding the follower in a first direction along said sliding surface; and resilient means continuously urging the follower toward said actuator with a return force of determinable value acting parallel to said sliding surface;

said actuator and said resilient means combining to continuously urge said follower against said sliding surface to create a friction force that opposes sliding motion of said follower, said friction force being less than and varying with said return force in a predetermined ratio so that, upon release of the actuator, the resilient means can always return the module to an initial position even though the return force may be reduced;

wherein said actuator is cam rotatable with a force against an angled surface of said follower that resolves the cam force on the follower into a parallel component opposing the resilient means and a normal component generating said friction force.

3. A variable hysteresis module as in claim 2 wherein said resilient means includes at least one spring.

4. A variable hysteresis module as in claim 3 wherein said actuator includes means for connection with a vehicle accelerator pedal and said resilient means include multiple springs, each capable of returning the pedal to a released position.

5. A variable hysteresis module as in claim 1 wherein said return force of the resilient means is variable with movement of the follower, whereby the friction force is proportionally variable so that hysteresis of the module varies over a range of travel of the actuator.

6. A variable hysteresis mechanism for use with an accelerator pedal for an electronic throttle control system for vehicles, said mechanism including:

a back plate having a sliding surface;

a follower having a first side engaging and slidable along said sliding surface, a second side normal to said sliding surface and a third side forming acute angles with said second and first sides;

an actuator movable against said third side of the follower for sliding the follower in a first direction along said sliding surface; and resilient means acting against the second side and continuously urging the follower toward said actuator with a return force of determinable value acting parallel to said sliding surface;

said actuator and said resilient means combining with the angled third side to continuously urge said follower against said sliding surface to create a friction force that opposes sliding motion of said follower, said friction force being less than and varying with said return force in a predetermined ratio so that, upon release of the actuator, the resilient means can always return the mechanism to an initial position even though the return force may be reduced.

7. A variable hysteresis mechanism as in claim 6 wherein said actuator includes means acting against said angled third side that resolves actuator force on the follower into a parallel component opposing the resilient means and a normal component generating said friction force.

8. A variable hysteresis mechanism as in claim 7 wherein said resilient means includes at least one spring.

9. A variable hysteresis mechanism as in claim 8 wherein said actuator includes means for connection with a vehicle accelerator pedal and said resilient means include multiple springs, each capable of returning the pedal to a released position.

10. A variable hysteresis mechanism as in claim 6 wherein said return force of the resilient means is variable with movement of the follower, whereby the friction force is proportionally variable so that hysteresis of the mechanism varies over a range of travel of the actuator.

* * * * *